United States Patent [19]

Lindblom et al.

[11] 4,083,167
[45] Apr. 11, 1978

[54] MULTI-ROW CROP HEADER

[75] Inventors: Curtis H. Lindblom, New Holland; Joe E. Shriver, East Earl; Robert A. Wagstaff, New Holland; Edward H. Priepke, Stevens, all of Pa.

[73] Assignee: Sperry Rand Corporation, New Holland, Pa.

[21] Appl. No.: 713,468

[22] Filed: Aug. 11, 1976

[51] Int. Cl.² ............................................. A01D 45/02
[52] U.S. Cl. ....................................................... 56/98
[58] Field of Search ..................... 56/94, 98, 106, 108, 56/111

[56] References Cited

U.S. PATENT DOCUMENTS

| 3,352,093 | 11/1967 | Procter | 56/98 |
| 3,404,516 | 10/1968 | Carlson | 56/10.3 |
| 3,585,789 | 6/1971 | Blanshine | 56/98 |
| 3,654,752 | 4/1972 | Segredo | 56/98 |
| 3,791,117 | 2/1974 | Lawrence | 56/98 |
| 3,808,783 | 5/1974 | Sutherland et al. | 56/106 |

Primary Examiner—Russell R. Kinsey
Attorney, Agent, or Firm—Frank A. Seemar; John B. Mitchell; Joseph A. Brown

[57] ABSTRACT

A multi-row crop header for a forage harvester has a central rear discharge outlet, a transversely extending consolidating auger and a plurality of fore-and-aft extending crop dividers. The crop dividers define forward crop passageways and rear crop passageways extending from the forward crop passageways. At least some of the rear crop passageways are angled inwardly from front to rear, toward the longitudinal centerline of the header. Disposed within each of the rear crop passageways is a set of butt-gripping chains that grip the butt-ends of the stalks and convey the same rearwardly toward the central discharge outlet. As the butt-ends are conveyed inwardly toward the central discharge outlet, upper directing chains on the header direct the upper intermediate portions of the stalks inwardly toward the longitudinal centerline of the header and upper guide arms on the header direct upper more remote portions of the stalks inwardly toward the centerline of the header The cooperation between the auger, the angled rear passageways, the lower butt-gripping chains, the upper directing chains and the upper directing guide arms tends to orient the crop stalks in a generally fore-and-aft direction as they reach the middle or central section of the auger where the stalks are fed rearwardly through the rear discharge outlet and thereby promotes butt-end feeding of the stalks which results in a more efficient harvesting operation.

8 Claims, 3 Drawing Figures

MULTI-ROW CROP HEADER

CROSS REFERENCE TO RELATED APPLICATIONS

Reference is hereby made to the following co-pending U.S. application dealing with related subject matter and assigned to the assignee of the present invention. "A Crop Header for a Crop Harvesting Machine Having a Crop Consolidating Component which Detachably Mounts a Plurality of Interchangeable Crop Gathering Components", by T. William Waldrop et al, U.S. Ser. No. 713,565, filed Aug. 11, 1976.

BACKGROUND OF THE INVENTION

1. Field of the Invention

The present invention relates generally to a row crop header for a forage harvester, and, more particularly, is directed to an improved multi-row crop header which promotes butt-end feeding of crop stalks to the harvester.

2. Description of the Prior Art

A typical forage harvester operating in row planted stalk-crops such as corn or the like, includes a mobile base unit and a row crop header for gathering the crop from the field. The base unit includes a forward, generally rectangular, inlet opening, a feed roll assembly spanning the width of the inlet opening and a cutter mechanism for cutting or chopping the stalks into small pieces. The row crop header has a rear central discharge outlet for communication with the inlet opening when the header is mounted on the front of the base unit. As is well known, the crop is gathered by the header and delivered rearwardly through the central discharge outlet and inlet opening into the feed roll assembly that feeds the crop to the cutterhead.

Over the years, the size of the forage harvesters have become larger; however, the width of the cutterhead and thus the width of the feed roll assembly and the inlet opening has remained relatively the same. The reason for this is well recognized by those skilled in the art in that, for maximum efficiency, there exists a direct relationship between the width of the cutterhead, the horsepower of the machine and the thickness of the mat of material to be cut (uniform length of cut). Furthermore, it is well recognized that the best results are achieved when the crop, such as corn, are fed to the feed roll assembly, and thus the cutterhead, butt-end first, generally perpendicular to the cutterhead.

The butt-end, generally perpendicular feeding of the crop to the cutterhead has generally not been a problem in the one row and two row headers; however, the same cannot be said for the three and four and greater number of row headers. In the larger row unit headers, a consolidating auger is generally required to laterally convey the crop to the narrow central discharge outlet. Generally, the stalks are moved toward the central discharge outlet with their axis generally parallel to the transverse auger which results in crosswise feeding of the stalks into the feed rolls and cutterheader. Such crosswise feeding of the stalks to the cutterhead results in a nonuniform length of cut which is objectionable. Further, such lateral movement of the stalks tends to cause jamming of material at the discharge outlet thereby resulting in an uneven feeding of the stalks to the cutterhead.

SUMMARY OF THE INVENTION

Accordingly, the present invention provides an improved multi-row crop header for a harvesting machine that facilitates butt-end feeding of stalk crops in a generally fore-and-aft extending orientation to the base unit of the machine.

More specifically, the multi-row crop header is of the type having a central rear outlet and a transversely extending auger for conveying crop material laterally to the central outlet and includes a plurality of fore-and-aft extending dividers defining forward crop passageways therebetween. Disposed within each of the passageways is a severing means for severing the stalks from the ground.

The dividers further define a plurality of rear crop passageways extending from the respective forward crop passageways and terminating at spaced apart locations along the auger. Preferably, some of the rear crop passageways are angled inwardly from front to rear. Operable along each of the rear crop passageways are lower conveying means for gripping the butt-ends of the stalks crops and conveying the same rearwardly toward the auger.

The crop header further includes upper directing means for directing the upper portions of the stalks inwardly toward the longitudinal centerline of the header as the butt-ends of the stalks are conveyed rearwardly along the rear passageways and laterally inwardly by the auger. The upper directing means includes upper conveying means positioned upwardly from the lower conveying means and operably associated with the rear crop passageways that are angled inwardly.

The upper directing means further includes an upper stalk guide that extends outwardly and forwardly from a rear portion of the header and is so positioned relative to each of the angled rear crop passageways so as to direct the upper portions of the stalks inwardly as the unit advances over a field.

BRIEF DESCRIPTION OF THE DRAWINGS

In the course of the following description references will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left," "upwardly," etc. are words of convenience and are not to be construed as limiting terms.

IN GENERAL

Figure 1:
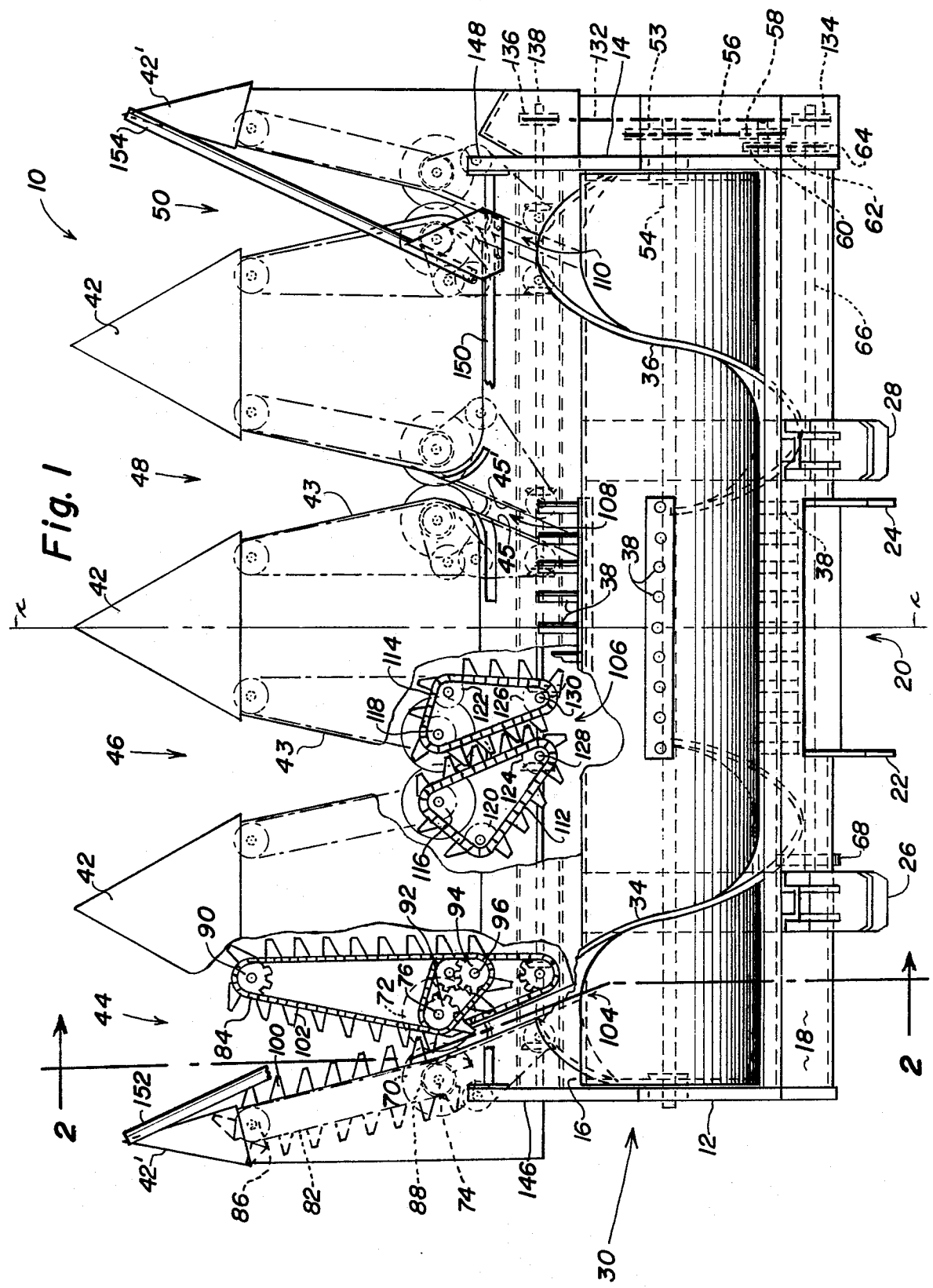
FIG. 1 is a plan view of a multi-row crop header embodying the present invention with portions of the header being broken away to more clearly show the operational components thereof.
Figure 2:
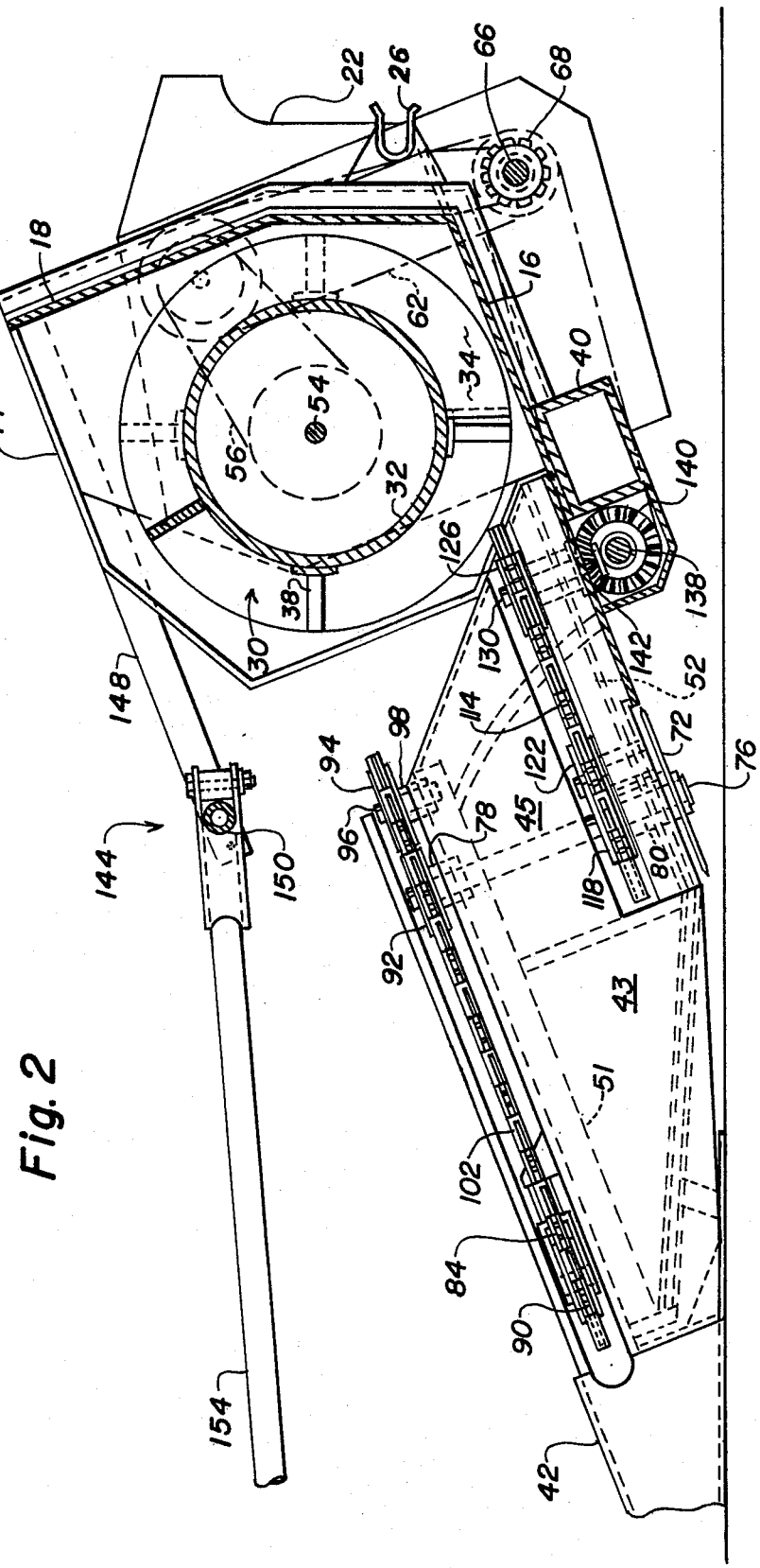
FIG. 2 is a side elevational view of the multi-row crop header as seen along section lines 2—2 of FIG. 1.

Referring now to the drawings, and particularly to FIGS. 1 and 2, there is shown a multi-row crop header, being indicated generally by the number 10, incorporating the principles of the present invention and being adapted to be mounted on the front of a harvesting unit, such as a pull-type or self-propelled forage harvester (not shown) for gathering row crops such as corn or the like as the unit advances over a field of row planted stalk crops. As will be clearly understood from the following discussion, the row crop header 10 is specifically designed to facilitate the butt-end feeding of stalks to the harvester unit. The invention is not specifically limited to a four-row header model, as shown in FIG. 1, but is equally applicable to a three row model, as well as to a five or six or greater number of row models.

As seen in FIGS. 1 and 2, the header 10 includes a frame having left and right sidewalls 12,14 respectively, a bottom wall 16 and a rear wall 18 with a central discharge 20 outlet defined therein. On opposite sides of the discharge outlet 20 is a pair of throat plates 22,24, each projecting outwardly and rearwardly from the rear wall 18. The rear wall 18 also supports a pair of conventional mounting brackets 26,28 for attaching the header 10 to the front of a harvesting unit. The mounting brackets 26,28 are so positioned with respect to the discharge outlet 20 such that when the header 10 is mounted on the front of the harvesting unit, the discharge outlet 20 is in communication with the infeed opening to the feed rolls and cutterhead of the harvesting unit.

Transversely extending between the sidewalls 12,14 and rotatably mounted thereto is an auger 30 having an auger cylinder 32 and left and right flights 34,36. The respective flights 34,36 are spirally wrapped in opposite directions around the auger cylinder 32 inwardly from the respective ends thereof toward the center section so as to laterally convey crop material along the auger and consolidate the same at the central section of the auger. Supported on the central section of the auger cylinder 32 is an array of spaced apart projecting fingers 38 that direct the consolidated material rearwardly through the central discharge outlet 20.

Disposed between the lower front corners of the sidewalls 12,14 and adjacent the front edge of the bottom wall 16 is a transversely extending tubular frame member 40. The frame member 40 supports a plurality of spaced apart fore-and-aft extending crop dividers, 42' that form forward crop passageways 44,46,48 and 50 for receiving respective rows of stalk crops as the unit advances over a field. Each of the dividers, 42' are of sheet metal structure fabricated on a subframe structure having upper frame member 51 and lower frame member 52 (see FIG. 2). The dividers each further comprise a pair of opposing forward wall portions 43 and a pair of opposing rearward wall portions 45,45' (see FIGS. 1 and 2).

The auger 30 is driven in a counterclockwise direction, as viewed in FIG. 2, by the auger sprocket 53 that is supported on the right end of auger shaft 54 that rotatably mounts the auger 30 between the sidewalls 12,14. The auger sprocket 53 is connected by chain 56 to the outboard sprocket 58 of a double sprocket arrangement rotatably mounted on the upper right corner of right sidewall 14. The upper inboard sprocket 60 is connected by chain 62 to an inboard sprocket 64 of a lower double sprocket arrangement supported on the right end of rotatably mounted drive shaft 66 which transversely extends below the lower rear corner formed by the bottom wall 16 and rear wall 18. The left end of drive shaft 66 terminates adjacent the inboard side of the left mounting bracket 22 and supports driven sprocket 68 which is connected by a chain (not shown) to a drive sprocket (not shown) of the mobile harvesting unit to which the header 10 is attached.

CROP GATHERING COMPONENTS FOR FACILITATING BUTT-END FEEDING OF CROP STALKS

Referring still to FIGS. 1 and 2, various crop gathering components are illustrated in association with the header 10 for facilitating butt-end feeding of crop stalks to the auger 30 in a manner which promotes orientation of the stalks in a fore-and-aft position as the butt-ends thereof are conveyed toward and feed rearwardly by the auger 30 into the discharge outlet 20 of the header 10.

The crop passageways 44 and 46 on the left side of the longitudinal centerline c—c of header 10 are identical to the right side crop passageways 48,50 but with the various components being reversed as to their respective locations. Furthermore the various components of the left outboard passageway 44 are identical to the various components associated with the left inboard passageway 46. Therefore, for the sake of brevity and convenience, only the components associated with the left outboard passageway 44 will be described in detail.

Disposed within the rear portion of the forward crop passageway 44 is a severing means in the form of two rotary discs 70,72 which project into the passageway and are disposed in an over-lapping relationship and operative to sever the crop. The discs 70,72 are respectively supported on the lower ends of vertical shafts 74,76. Each of the shafts 74,76 is journalled in upper and lower bearings 78,80, respectively mounted on upper and lower frame members 51,52.

The forward crop passageway 44 is further provided with a pair of upper gathering chains 82,84 which are respectively disposed along the outboard and inboard sides of the passageway. The outboard chain 82 is entrained around a front upper sprocket 86 and a rear upper sprocket 88 whereas the inboard chain 84 is entrained around corresponding front upper and rear upper sprockets 90,92 respectively and further around a rearmost upper sprocket 94 which is rearwardly of sprocket 92 and offset inwardly toward the centerline c—c of header 10. The purpose of the inboard chain 84 having a rearwardly and inwardly extending portion will be discussed later on in conjunction with other various components of the header 10.

As best seen in FIG. 2, the corresponding front upper outboard and inboard sprockets 86,90 are rotatably supported within spring urged brackets suitably fastened to the upper sheet metal structures of the respective adjacent dividers, 42'. The corresponding rear upper outboard and inboard sprockets 88,92 are respectively supported on the upper ends of shafts 74,76. And the rear offset upper inboard sprocket 94 is supported on shaft 96 which is journalled for rotation within bearing 98 suitably mounted on upper frame member 51.

The outboard and inboard chains 82,84 contain respective lugs 100,102 which project outwardly into the passageway 44 and cooperate together in engaging the upper portions of the stalks to funnel the same rearwardly along the passageway 44 to the severing means wherein the discs 70,72 sever the butt-ends of the stalks from the ground.

The fore-and-aft crop dividers, 42' further define rear crop passageways 104,106,108 and 110, each being an extension of the respective forward crop passageways 44,46,48 and, 50 defined by opposing rearward wall portions 45,45' as shown for example in passageway 108 (see FIG. 1). Again, the discussion to follow will be directed to the left outboard rear passageway 104, it being understood that the passageways 104,106 to the left of the centerline c—c are mirror images of the passageways 108,110 to the right side of the centerline c—c.

The rear crop passageway 104 is continuous with the forward crop passageway 44 and generally extends from the position of the upper rear sprockets 88 and 92 and terminates at the front edge of the auger 30. Furthermore, the rear passageway 104 is angled, from front to rear, inwardly toward the centerline c—c of header 10 such that crop stalks passing therethrough are guided toward the discharge outlet 20.

Disposed within the rear passageway 104, along the respective outboard and inboard sides thereof, is a pair of lower butt-end gripping chains 112,114 which cooperate together to grip the butt-ends of the stalks severed by the rotary discs 70,72 and convey the same rearwardly along the passageway 104 to the auger 30. The respective outboard and inboard butt gripping chains 112,114 are each entrained around three corresponding sprockets: front lower sprockets 116,118, respectively; lower idler sprockets 120,122 respectively; and rear lower sprockets 124,126 respectively. The outboard lower front sprocket 116 is supported on shaft 74 between upper rear sprocket 88 and disc 70, and the inboard lower front sprocket 118 is supported on shaft 76 between upper rear sprocket 92 and disc 72. The rear lower outboard sprocket 120 is supported on shaft 128 and lower rear inboard sprocket 122 is supported on shaft 130. Shafts 128,130 are journalled within suitable bearings mounted on corresponding lower frame members 52. The outboard and inboard idler sprockets 120,122 are similarly mounted on corresponding frame elements of the adjacent dividers 42.

As the lower butt-gripping chains 112,114 grip the butt-ends of the severed stalks and move them rearwardly along the angled rear passageway 104 toward the auger 30, the upper portions of the stalks are directed inwardly toward the centerline c—c of header 10 by the rear portion of the upper inboard gathering chain 84 thereby tending to orient the severed stalks in a fore-and-aft position.

For driving the upper gathering chains 82,84; the lower butt-gripping chains 112,114; and the rotary discs 70,72, a chain 132 is connected around the lower outboard sprocket 134 (adjacent the lower inboard sprocket 64 on the right sidewall 14) and drive sprocket 136 supported on the right end of a transverse shaft 138 that extends along and in front of transverse frame member 40. The transverse shaft 138 supports a number of spaced-apart vertical bevel gears 140 that driveably mate with a corresponding number of horizontal bevel gears 142 supported on the lower ends of respective shafts 128,130. The drive, as just explained, is such that the respective upper and lower chains 82,84 and 112,114 are moved rearwardly along the respective front and rear crop passageways 44,46,48,50 and 104,106,108,110 whereas the discs 70,72 are rotated in opposite directions, inwardly toward the passageways 44-50.

To further promote butt-end feeding, header 10 is provided with a stalk guide 144 for directing the more remote upper portions of the stalks inwardly toward the centerline c—c. The stalk guide 144 acts in concert with the rear portion of the upper inboard gathering chains 84 in directing upper portions of the stalks laterally inwardly as the butt-ends are moved laterally inwardly along the rear passageway 104 by the lower butt-gripping chains 114,116.

The guide 144 includes left and right legs 146,148 and a transversely extending base bar 150 supported between the legs 146,148. The left and right legs 146,148 are respectively attached to the sidewalls 12,14 so as to support the base bar 150 forwardly of the auger 30 and above the rear portion of dividers 42. Removably attached to the base bar 150 are left and right guide arms 152,154 which diverge outwardly over the outboard forward passageways 44 and 50 and corresponding rear passageways 104,110. Preferably, the arms 152,154 are generally parallel to the respective rear passageways 104,110.

Although only two such guide arms 152,154 have been shown in association with the two outboard crop passageways, it should be understood that similar guide arms could be attached to the base bar 150 so as to extend in a similar fashion over the inner two crop passageways.

BUTT-END FEEDING OPERATION

Figure 3:
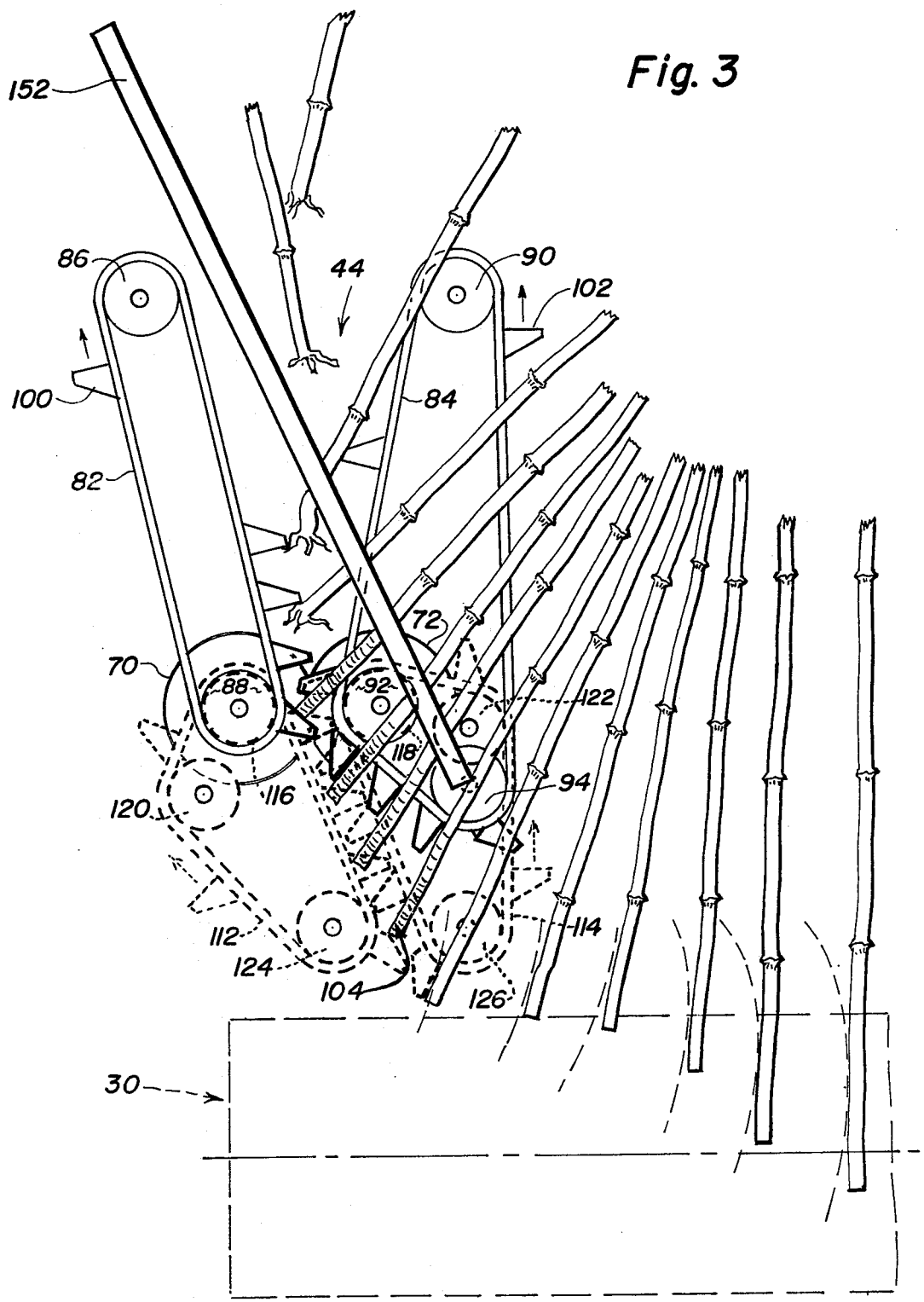
FIG. 3 is a diagrammatical view representing the path of a row of cornstalks as they enter one of the crop passageways and are conveyed rearwardly and inwardly with the butt-ends being conveyed along the rear angled passageway whereas the upper portions of the stalks are directed inwardly toward the longitudinal centerline of the header.

The butt-end feeding operation will now be discussed in reference to FIG. 3 which schematically represents a row of stalks as they enter the left outboard passageway 44.

As stalks enter the forward passageway 44, the upper remote portions are directed by the guide arm 152 inwardly toward the longitudinal centerline c—c of header 10. The upper intermediate portions of the stalks are then gathered by the upper gathering chains 82,84 and moved rearwardly along the passageway wherein the rotary discs 70,72 sever the butt-ends of the stalks from the ground.

As the stalks are severed, the butt-ends thereof are gripped by the lower chains 112,114 and are moved rearwardly along the angled rear passageway 104 to the auger 30. As the butt-ends are conveyed rearwardly and inwardly by chains 112,114, the intermediate upper portions are directed inwardly toward the centerline c—c by the rear portion of the upper inboard gathering chain 84.

The lower chains convey the butt-ends to the auger 30 wherein the auger flight 34 moves the stalks laterally inwardly to the central or middle section of the auger. As the butt-ends are moved laterally by the flight 34, the upper intermediate and remote portions of the stalks are moved or directed inwardly by the rear portion of upper chain 84 and guide arm 152. Thus, the stalks are generally disposed in a fore-and-aft disposition when they reach the middle section of the auger wherein the auger fingers 38 direct or feed the stalks rearwardly through the discharge outlet 20.

It can be appreciated, from the above discussion, that the cooperation of the various components tends to orient the stalks in a generally fore-and-aft direction, thereby promoting butt-end feeding of the stalks to the harvester unit.

It is thought that the invention and many of its attendant advantages will be understood from the foregoing description and it will be apparent that various changes may be made in form, construction and arrangement of the multi-row crop header with out departing from the spirit and the scope of the invention or sacrificing all of its material advantages, the form hereinbefore described being merely a preferred or exemplary embodiment thereof.

Having thus described the invention, what is claimed is:

1. A multi-row crop header for a crop harvesting machine having a central rear outlet and a transversely extending auger for conveying crop material laterally to said outlet and feeding the same therethrough, said header comprising:
   (a) a plurality of fore-and-aft extending dividers, comprising a frame and a first pair of wall portions and a second pair of wall portions mounted on said frame and extending along opposite sides of said dividers said first wall portions defining forward crop gathering passageways between adjacent dividers;
   (b) cutting means including elements mounted on said frame and disposed rearwardly of said forward passageways for severing stalks received by said forward passageways;
   (c) a plurality of rear passageways defined between adjacent dividers by said second wall portions, said rear passageway extending from a like plurality of respective forward passageways and terminating at spaced apart locations along said auger;
   (d) at least some of said rear passageways converging toward said central rear outlet;
   (e) lower conveying means supported on said frame and operable along each of said rear passageways for gripping the butt-ends of severed stalks and conveying the same rearwardly toward said auger; and
   (f) upper means supported on said frame and operable along at least the onboardmost of said rear converging passageways for directing the upper portions of the stalks inwardly toward the longitudinal centerline of the header as the butt-ends of the stalks are conveyed rearwardly along the rear passageways and fed into said auger at said spaced apart locations whereby butt-end feeding of said stalks to said harvester unit is facilitated.

2. A multi-row crop header as described in claim 1, wherein said upper directing means includes conveyor means positioned above the lower conveying means for directing the upper portions of the stalks inwardly from their respective butt-ends toward the centerline of the header such that the upper portions of said stalks are moved laterally as the butt-end of the stalks are moved laterally by the auger thereby moving the stalks laterally inwardly such that the stalks are disposed in a generally fore-and-aft direction as the same are fed rearwardly toward said central discharge outlet.

3. A multi-row crop header as described in claim 2, wherein said conveyor means includes an endless chain with a series of outwardly projecting lugs, said chain being disposed adjacent the inboard side of said respective passageways such that said lugs extend outwardly into said passageway to engage the upper portions of the stalks received within said passageway.

4. A multi-row crop header as described in claim 3, wherein said chain extends along the forward passageway and partly along the rear passageway.

5. A multi-row crop header as described in claim 2, wherein said upper directing means extends along each of said respective forward crop passageways and extends along said rear crop passageways that converge inwardly toward the central discharge outlet.

6. A multi-row crop header as described in claim 5, wherein said upper directing means includes a pair of conveyors respectively disposed on opposite sides of each forward crop passageway, said conveyor on the inboard side of said front crop passageway also being disposed along the inboard side of said rear passageway that converge inwardly.

7. A multi-row crop header as described in claim 2, wherein
   at least the two outboard rear crop passageways converge inwardly toward the central discharge outlet;
   said upper directing means includes and upper stalk divider for each of said rear outboard crop passageways, each of said respective stalk dividers extending outwardly and forwardly from a rear portion of said header and positioned relative to said respective rear crop passageway so as to direct the upper portions of a stalk inwardly toward the centerline of the header as the butt-end portion of the stalk is conveyed inwardly by the respective lower conveying means thereby tending to position the severed stalk in a generally fore-and-aft direction as the same is fed rearwardly through said discharge outlet.

8. A multi-row crop header as described in claim 2, wherein said upper directing means extends outwardly from the rear portion of said header and forwardly over said fore-and-aft dividers, said directing means being positioned relative to said converging rear crop passageways, so as to direct the upper portion of the stalks laterally inwardly as the butt-end of the stalks are laterally augered inwardly such that the stalks are disposed in a line generally parallel, relative to the centerline of the header, as said stalks are fed rearwardly through said discharge outlet.

* * * * *